United States Patent [19]

Jadamus et al.

[11] Patent Number: 5,153,076
[45] Date of Patent: Oct. 6, 1992

[54] METHOD OF PREPARING A CHEMICAL COMPOSITION COMPRISED OF MOLDING COMPOUNDS BASED ON POLYPHENYLENE ETHERS AND SULFUR-VULCANIZABLE RUBBERS CONTAINING DOUBLE BONDS

[75] Inventors: Hans Jadamus; Klaus-Peter Richter, both of Marl, Fed. Rep. of Germany

[73] Assignee: Huels Aktiengesellschaft, Marl, Fed. Rep. of Germany

[21] Appl. No.: 671,647

[22] Filed: Mar. 20, 1991

Related U.S. Application Data

[63] Continuation of Ser. No. 115,567, Oct. 29, 1987, abandoned, which is a continuation of Ser. No. 831,449, Feb. 20, 1986, abandoned.

[30] Foreign Application Priority Data

Mar. 4, 1985 [DE] Fed. Rep. of Germany ....... 3507506
Oct. 18, 1985 [DE] Fed. Rep. of Germany ....... 3537154

[51] Int. Cl.$^5$ .............................................. B32B 27/32
[52] U.S. Cl. ..................................... 428/521; 428/523; 156/307.1; 156/307.7; 525/133; 525/152
[58] Field of Search ........................... 156/307.1, 307.7; 428/521, 523; 525/133, 152

[56] References Cited

U.S. PATENT DOCUMENTS

| | | | |
|---|---|---|---|
| 3,920,770 | 11/1975 | Nakashio et al. | 525/152 |
| 4,334,044 | 6/1982 | Kotani et al. | 525/152 |
| 4,647,613 | 3/1987 | Jadamus et al. | 525/68 |
| 4,921,762 | 5/1990 | Jadamus et al. | 428/521 |

FOREIGN PATENT DOCUMENTS 118830 7/1983 Japan .................... 525/152

OTHER PUBLICATIONS

W. Hofmann, "Kautschuktec Enlogie," Gentner-Verlag, Stuttgart, 1980, pp. 255ff.

*Primary Examiner*—Paul R. Michl
*Assistant Examiner*—Edward J. Cain
*Attorney, Agent, or Firm*—Oblon, Spivak, McClelland, Maier & Neustadt

[57] ABSTRACT

A method of effecting chemical bonding between a thermoplastic polymer having the recurring unit:

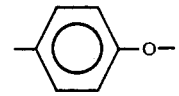

and a synthetic rubber, comprising, covulcanizing a polyphenylene ether containing, thermoplastic molding compound and said synthetic rubber by heating the mixture in the presence of a vulcanizing system, said polyphenylene ether containing, thermoplastic molding compound having the composition, a) 100 parts by weight of polymers of ortho-substituted phenols having the formula:

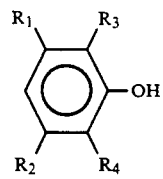

where $R_1$ and $R_2$ independently represent a methyl group or hydrogen, and $R_3$ and $R_4$ represent an alkyl group with up to 6 carbon atoms, or $R_3$ represents hydrogen and $R_4$ represents a tertiary alkyl group with up to 6 carbon atoms, b) 0-20 parts by weight polyalkenylenes, and, c) 0-100 parts by weight styrene polymers; and said synthetic rubber containing double bonds, being combined with fillers and plasticizers and being a member selected from the group consisting of (1) SBR rubbers, (2) BR rubbers, (3) IR rubbers, (4) IIR rubbers, (5) mixtures of at least two rubbers (1)-(4), and (6) mixtures of any one or more rubbers (1)-(5) with up to 80 wt. % of the rubber mixture being substituted by CIIR rubbers, up to 95 wt. % of the rubber mixture being substituted by NR rubber, up to 60 wt. % of the rubber mixture being substituted by CR rubber or up to 25 wt. % of the rubber mixture being substituted by NBR rubber.

19 Claims, 1 Drawing Sheet

METHOD OF PREPARING A CHEMICAL COMPOSITION COMPRISED OF MOLDING COMPOUNDS BASED ON POLYPHENYLENE ETHERS AND SULFUR-VULCANIZABLE RUBBERS CONTAINING DOUBLE BONDS

This application is a continuation of application Ser. No. 115,567, filed on Oct. 29,1987, now abandoned, which is a continuation of Abandoned application Ser. No. 831,449 filed Feb. 20, 1986.

BACKGROUND OF THE INVENTION

1. Field of the Invention

The present invention relates to a method of preparing a solid composition comprised of a thermoplastic molding compound based on polyphenylene ethers (PPEs), on the one hand, and a sulfur-vulcanizable rubber component, on the other; and the product obtained from the method.

2. Discussion of the Background

Often a single material cannot provide all the properties which are desired of an article of manufacture. Thus, a single chemical substance will not provide an article which simultaneously has high strength and rubber elasticity, or high hardness and stiffness, on the one hand, and high traction on the other.

In order to provide structural component parts with properties which a single constituent cannot alone contribute to the component, different parts are manufactured from combinations of pieces which are comprised of several different materials. Often a necessary precondition for good performance characteristics of such articles is good adhesion between the pieces comprised of different materials.

Articles which are formed of combinations of thermoplastics and rubber are ordinarily bound to form an integral structure by mechanical clamping or the like, adhesive bonding, or covulcanization using special covulcanization auxiliary agents.

The force of bonding achieved by mechanical clamping or the like is adequate to withstand only low stresses. On the other hand, it is very costly to use the adhesive bonding technique in the mass production of articles. Moreover, the use of adhesives often leads to additional problems with materials.

The best bonding technique is to covulcanize the stiff molding compound and the rubber material. The state of the art with this technique is that either the surface of the stiff molding compound must be pretreated and/or the rubber mass must be specially treated.

One proposed treatment of the surface of the thermoplastic component (L. H. Nitzsche, 1983, *Kautschuk+Gummi, Kunststoffe*, 36:572-576) consists of painting the thermoplastic with an aqueous solution of vinylpyridine latex, resorcinol, and formaldehyde (see "Keilriemen", a monograph from Arntz-Optibelt-Gruppe Hoexter, pub. Verlag Ernst Heyer, Essen, FRG, 1972, p. 83).

Another proposed treatment involves coating the thermoplastic surface with a gasoline solution of isocyanates (Bayer-Taschenbuch fuer die Gummi-Industrie, 1963, p. 254) One of the methods involves the treatment of the rubber mass with adhesion promoting additives. Suitable such additives are, e.g., combinations of resorcinol, formaldehyde-dispensing agents, silicic acid, zinc oxide, and fatty acids (W. Kleemann, *Mischungen fuer die Elastverarbeitung*, Leipzig, 1982, p. 300).

It is also known that SBR and EPR rubbers, as well as polybutadienes, show an unexpected, excellent adhesion to certain plastics upon relatively long thermal treatment. These certain plastics, distinguished by having recurring units of the formula:

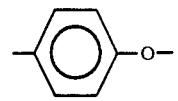

comprise poly(2,6-dimethyl-1,4-phenylene ethers), polysulfones, and polycarbonates. For comparative purposes it should be noted that polystyrenes, which do not contain this structural unit, have an adhesive force which is smaller by a factor of >6 (P. Dreyfuss and M. L. Runge, *J. Appl. Polym. Sci.*, 23:1863-1866). These authors assert that this method achieves outstanding binding of the elastomeric and plastic layers in many cases, even if the elastomer has no double bonds (as is the case with EPR rubber). However, the method of thermal adhesion on the part of certain plastics has the following major disadvantages:

The adhesive strengths achieved still do not appear to be adequate to the extent that such binding systems can be used industrially;

Pure polyphenylene ethers play an economically minor role, because of their poor processibility and because of their inadequate impact strength. All PPE-containing polymer mixtures contain added polymers which have substantially inferior binding properties. The above-described method is not considered suitable for economically important polymer mixtures, all of which have styrene polymers present in the amount of >10 wt. %;

For industrial applications, the rubber employed contains a filler or fillers. One would expect, that the filler additive, however, adversely affects the adhesion properties of the rubber in comparison to filler-free rubbers;

The resulting compound is not stabile to the action of hydrocarbons; and

The treatment times are extremely long. Multi-hour processing operation times cannot be integrated with modern engineering arrangements for manufacturing molded parts.

Under these conditions it is unsurprising that there has been no further refinement of this method nor any industrial adoption of it.

When one examines the method, despite these objections, one concludes that the authors aimed at a method for producing a physical bond between thermoplastics and synthetic rubbers. In particular, an objective of the method is to prevent cold flow on the one hand and to avoid chemical bonding on the other hand, for It has been Found, that as the degree of crosslinking of the rubber increases, the adhesive force decreases (A. Ahagon and A. N. Gent, 1975, *J. Polym. Sci., Polym. Phys. Ed.*, 13:1285 Abstract).

It has been learned by conducting tests that the adhesion is not at all as good as represented (see the Comparison Tests, infra). In certain individual cases the separation forces are immeasurably small, because the rubber becomes crumbly during the thermal treatment. A need therefore continues to exist for an improved method of bonding PPE containing thermoplastic molding compounds to elastomeric rubbers.

SUMMARY OF THE INVENTION

Accordingly, one object of the present invention is to provide a method of achieving adhesion between PPE-contining thermoplastic molding compounds and elastomeric rubbers, while achieving the following requirements:

(1) The method should be applicable not only to PPEs, but also in general to polystyrene-containing and to hydrocarbon-containing PPE molding compounds.
(2) The adhesion should be capable of being developed within a few minutes.
(3) Adhesive strengths should be achieved which are better than those with known bonding systems.
(4) The bonding system should be resistant to hydrocarbons.

Briefly, these objects and other objects of the present invention as hereinafter will become more readily apparent can be attained by a method of effecting chemical bonding between a thermoplastic polymer having the recurring unit:

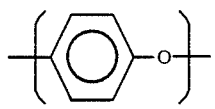

and a synthetic rubber by covulcanizing a polyphenylene ether containing, thermoplastic molding compound and said synthetic rubber with heating in the presence of a vulcanizing system, said polyphenylene ether containing, thermoplastic molding compound having the composition:

(a) 100 parts by weight of polymers of ortho-substituted phenols having the formula:

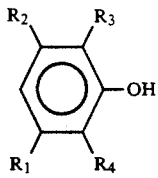

where $R_1$ and $R_2$ independently represent a methyl group or hydrogen, and $R_3$ and $R_4$ represent sn alkyl group with up to 6 carbon atoms, or $R_3$ represents hydrogen and $R_4$ represents a tertiary alkyl group with up to 6 carbon atoms;
(b) 0–20 parts by weight polyalkenylenes; and
(c) 0–100 parts by weight styrene polymers;
and said synthetic rubber containing double bonds, being combined with fillers and plasticizers and being a member selected from the group consisting of (1) SBR rubbers, (2) BR rubbers, (3) IR rubbers, (4) IIR rubbers, (5) mixtures of at least two of rubbers (1)–(4), and (6) mixtures of any one or more rubbers (1)–(5) with up to 80 wt. % of the rubber mixture being substituted by CIIR rubbers, up to 95 wt. % of the rubber mixture being substituted by NR rubber, up to 60 wt. % of the rubber mixture being substituted by CR rubber or up to 25 wt. % of the rubber mixture being substituted by NBR rubber.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

The FIGURE is a graph which shows the separation force (bond breakage) between thermoplastic and rubber components of the covulcanizate of the present invention and a composition bonded by a known prior art technique.

DESCRIPTION OF THE PREFERRED EMBODIMENTS

Figure 1:
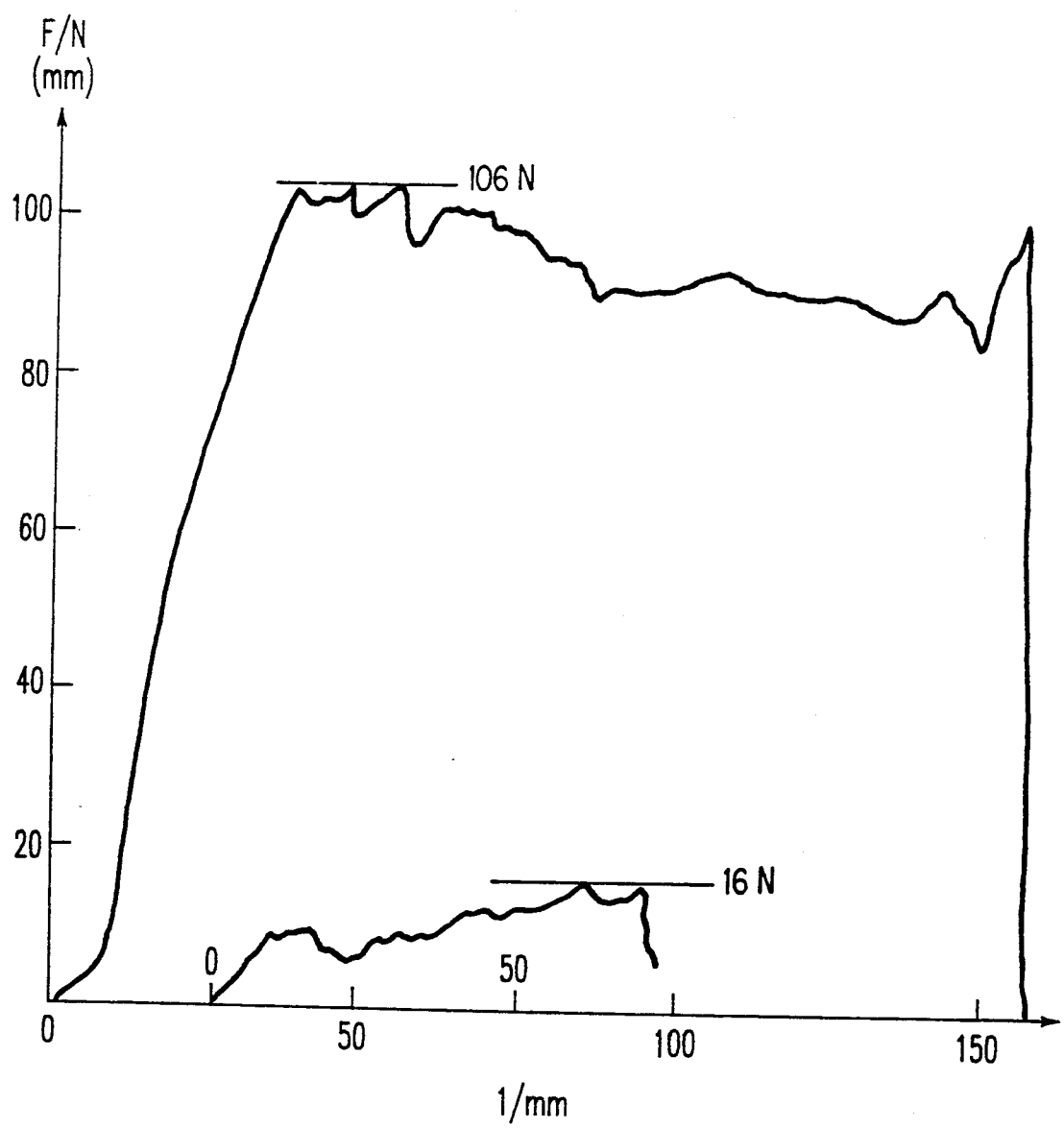

The discovery of the present invention is that in fact, excellent adhesive strengths are obtained, if, contrary to the teachings of Dreyfuss and Runge, a chemical bond is produced between a PPE-containing material and certain double-bond-containing, sulfur-vulcanizable rubbers. This bonding is achieved by covulcanizing the components at a temperature within the range of 140°–200° C. over a period of 30 sec. to 10 min. The temperature of the mass of the rubber mixture before the covulcanization is 40°–80° C., and the amount of accelerator present is <3 wt. %, based on the weight of the rubber.

The composition of the polyphenylene ether containing molding compound is as follows: (a) PPEs; (b) polyalkenylenes; (c) styrene polymers; and (d) additives.

Suitable polyphenylene ethers include polymers which are based on substituted phenols of the formula:

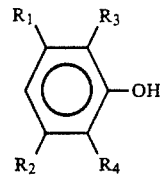

wherein
$R_1$ and $R_2$ represent, independently of each other, methyl, or preferably hydrogen;
$R_3$ represents hydrogen and $R_4$ represents a tertiary alkyl group with up to 6 carbon atoms, such as tert-butyl, or else $R_3$ and $R_4$ represent, independently of each other, an alkyl group of up to 6 carbon atoms. Preferably, the substituted phenol employed is 2,6-dimethylphenol, and, in fact, mixtures of the monomeric phenols may be used. Especially preferred are poly(2,6-dimethyl-1,4-phenylene ethers) having a limiting viscosity between 0.4 and 0.7 ml/g (measured in chloroform at 25° C.).

The PPEs may be prepared, e.g., from 2,6-dimethylphenol in the presence of complexing agents (Ger. OSs 32 24 692 and 32 24 691). Ordinarily the PPEs are used in the form of a powder or as a granulate.

The polyalkenylene component is prepared by the ring-opening or ring-extending polymerization of cycloalkenes (K. J. Ivin and T. Saegusa, "Ring-Opening Polymerisation", Vol. 1, Elsevier Appl. Sci. Pubs., London, 1984, esp. pp. 121-183).

The preferred polyalkenylenes are polyoctenylenes (A. Draexler, 1981, *Kautschuk+Gummi, Kunststoff,* pp. 185-190). Polyoctenylenes with different fractional amounts of cis- and trans double bonds, as well as with different J-values and thus different molecular weights, are obtainable by methods known in the literature. Preferred polyoctenylenes are those with a viscosity number from 50 to 350 ml/g, preferably 80-160 ml/g, determined on a 1 wt. % solution in toluene. The proportion of trans double bonds is 55-90%, preferably 75-80%.

Molding compounds based on PPEs and polyoctenylenes are described in Ger. Pat. Apps. P 34 36 780.2 and P 34 42 273.0.

The styrene polymer component which is used may be a styrene homopolymer and/or a high impact styrene polymer.

The styrene homopolymer is prepared in a known fashion from styrene by radical induced mass polymerization or by radical suspension polymerization. Their molecular weights are between 150,000 and 300,000 ("Kunststoff-Handbuch, Band V, Polystyrol", pub. Carl Hanser Verlag, Munich, 1969; and "Ullmanns Encyklopaedie der technischen Chemie", 4th Ed., Vol. 19, pub. Verlag Chemie, Weinheim, 1980).

The preferred high impact styrene polymers are prepared in known fashion, by polymerizing solutions of poly-cis-butadiene in styrene solution, the conditions of the polymerization being mass polymerization, solution polymerization in a solvent, or in an aqueous dispersion. In the so-called "mixed process", the solution of the rubber in styrene is mass prepolymerized and then the polymerization is concluded in an aqueous dispersion (U.S. Pat. Nos. 2,694,692 and 2,862,906).

The adjustment of the particle size of the soft phase is carried out in known fashion in the prepolymerization stage, before the so-called phase reversal. If necessary or desirable, polymerization may be carried out in the presence of known chain length regulators and/or radical initiators. Details such as, e.g., the relation between stirring speed and the size and distribution of the rubber particles in the resulting high impact polymer, are known to one skilled in the art (Freeguard, 1974, *Brit. Polym. J.*, 6:203-228).

The diameters of the particles in the elastomeric gel phase are ordinarily <10 micron, preferably <3.5 micron. The volumeric mean diameter of the particles is in the range 1-5 microns (disregarding any particles with diameter <0.5 micron or >10 micron).

The volumetric mean particle size is determined by measuring and averaging the equivalent diameters of particles (diameters of circles having the same areas) in thin layer electron micrographs.

The volumes of the particles (3rd power of the equivalent diameter) are used to plot a distribution curve, from which the volumetric mean equivalent diameter is calculated. For the evaluation, at least 2,000 particles should be measured.

The PPE molding compound may also be comprised of additives, such as stabilizers, agents which promote processibility, propellants or expanding agents, metal fibers, carbon black, graphite, metal glitter, titanium dioxide, and/or zinc sulfide. The amount of reinforcing material in the PPE molding compound can be up to 50 wt. %, that of fire retardant up to 15 wt. %, and that of all other additives together up to 5 wt. %, on the basis of the total weight of the molding compound.

Particularly suitable flame retardants include aromatic phosphorus compounds such as triphenylphosphine oxide and triphenylphosphate. Also, the composition may contain a halogenated flame retardant. Suitable halogen-containing flame retardant organic compounds include those described by H. Vogel, *Flammenfestmachen von Kunststoff*, pub. Huethig-Verlag, 1966, pp. 94 and 102. Other possible flame retardants include halogenated polymers such as halogenated PPEs (Ger. OS 33 34 068) and brominated oligo- or polystyrenes. The halogenated compounds should comprise halogen in an amount of >30 wt. %.

In the event a halogenated flame retardant is used, it is recommended that a synergist also be used. Suitable synergists include compounds of antimony, boron, and zinc. In general, these ingredients are employed in amounts of 0.5 to 10 wt. % on the basis of the weight of the thermoplastic mass.

Suitable stabilizers include organic phosphites such as didecylphenylphosphite and trilaurylphosphite, sterically hindered phenols, tetramethylpiperidine derivatives, benzophenone derivatives, and triazine derivatives.

Preferably, the PPE materials are prepared by mixing the components in the molten state. At least one component is melted and then the other components are mixed with the resulting melt. Another possibility is to melt all the components simultaneously and to mix the resulting melt.

Preferably, the ingredients of the PPE materials are melted at a temperature of 250°-350° C., particularly 260°-300° C., with residence times of 0.3-10 min., particularly 0.5-3 min, at the melting temperature.

Customary equipment for handling highly viscous melts is suitable for the melting and mixing operations, with the processing being either batchwise or continuous. Particularly suitable apparatus include double-screw kneader-mixers and co-kneaders.

As an alternative method of compounding the ingredients of the PPE composition, it is possible, for example, to prepare the ingredients by precipitation from a dissolved mixture of the components. A suitable common solvent for this technique is toluene, with methanol being used as a precipitating agent. The polymer mixture can also be recovered by evaporation of the solvent, for example, as described in German Patent application P 33 37 629.8.

The following double-bond-containing, sulfur-vulcanizable rubbers are suitable embodiments of the rubber component:

1. Styrene-butadiene rubbers: Both E-SBR and L-SBR rubbers having a styrene content between 18 and 40 wt. % may be employed. Suitable rubbers also include oil-extended SBR rubbers. The rubber may be employed in spherule form; however, it is more economical from a processing standpoint to start with a powdered, filler-containing rubber.

E-SBR rubber is prepared by the known method, which is the emulsion polymerization of 15-40 wt. % styrene and 85-60 wt. % butadiene. Such a rubber is described, e.g., in the plant journal "Buna ® EM Nr. 601" of Bunawerke Huels GmbH, Edition of Sept. 1982. The Mooney viscosity $ML_(1+4)$ of this rubber is between 30 and 120 (Mooney, 1957, *Rubber Chem. Techn.*, 30:460).

Particularly preferred as the rubber component is a pulverulent, filler-containing E-SBR rubber.

A number of different methods exist for the preparation of powdered, filler-containing rubbers. However, many of these methods are so time-consuming and complex that they have not acquired any practical importance. Just recently a method described in German OS 28 22 148 has realized industrial use. This method is distinguished by the fact that the rubber component in dissolved form is mixed with an aqueous suspension of a filler which suspension contains a water-soluble aluminum salt and water glass. A decisive factor in the success of the method is that not only must the aqueous filler dispersion have a pH of 3.0-3.7, but also, when this dispersion is combined with the rubber components, mineral acid must be added in amounts such that this pH range is maintained in the resulting mixture.

Whether one starts with the rubber in spherule form or in powder batch form, the covulcanizable rubber mixtures will invariably contain fillers such as carbon black or silicic acid; extenders such as mineral oils; vulcanizing agents such as sulfur; vulcanization accelerators; and age protectors. A particularly suitable agent which promotes processibility is polyoctenylene (A. Draexler, 1983, *Kautschuk+Gummi, Kunststoff,* pp. 1037-1043).

The mineral oil which is added may be paraffinic, naphthenic, or aromatic.

2. Butadiene rubbers: BR rubbers are suitable, regardless of whether they are produced with Li or with Co catalysts. Also, the proportion of cis-1,4 isomers has no influence on the suitability of this type of rubber. Polyoctenylene, as an agent which promotes processibility, can also be advantageously employed in these rubbers.

3. Isoprene rubbers: Synthetic isoprene rubbers are suitable, regardless of whether they are produced with Ti or Li catalysts. Natural rubber requires an additional mixture component. 3,4-isoprene rubber may also be used. The amounts of 1,4-cis and 1,4-trans, as well as of 1,2- and 3,4-polymerized units, have no effect on the adhesive properties.

4. Isobutene-isoprene rubbers: Isobutene-isoprene rubbers may be directly employed. Halogenated variants require additional mixing components.

5. Intermixtures of SBR, BR, IR, and IIR rubbers: Preferably these rubbers are 2- or 3-component mixtures. Mixtures of disparate proportions by weight of SBR and BR rubbers give especially good results.

6. Rubber mixtures comprising NR, CR, NBR, and/or CIIR rubbers: These are mixtures of rubber components 1 to 5 described above with up to 80 wt. % of the mixture substituted by CIIR rubber, with up to 95 wt. % of the mixture substituted by NR rubber, with up to 60 wt. % of the mixture substituted by CR rubber or with up to 25 wt. % of the mixture substituted by NBR rubber. Particularly advantageous are NR-SBR and NR-BR-SBR rubber mixtures, in which the amount of the NR rubber may be up to 95 wt. %.

Another rubber mixture is comprised of CR, SBR, and NBR rubbers. The amount of the CR rubber component may be up to 40 wt. %, and that of the NBR rubber up to 25 wt. %, based on the weight of the mixture. A third particularly suitable mixture is comprised of CR rubber in the amount of up to 45 wt. %, and of SBR rubber as an additional component.

If, in an SBR, BR, IR, or IIR rubber, or a mixture of these rubber components, an NBR rubber is substituted for up to 25 wt. % of the starting material, another suitable type of rubber mixture results.

The types of rubber formulations described above are produced by art known methods of preparing such rubber formulations as described in the literature (see Hofmann, "Kautschuktechnologie", pub. Gentner-Verlag, Stuttgart, 1980).

The Method of Covulcanization

The manufacture of molded pieces from combinations of stiff and rubber-elastic molding materials may be carried out in one or two stages.

In the one-stage method, the two melts are introduced into a mold where reaction takes place, and then the molded piece is allowed to cool.

In the two-stage method, the possibly performed rubber mass is forced against a molded piece which is comprised of the PPE material which has been fabricated by pressing, injection molding, or extruding. Simultaneously with or subsequent to this forcing, the combination of the rubber mass and the molded PPE piece is subjected to the vulcanization process. The said forcing is brought about by pressing, injection molding, or extruding. Thus, the choice of the rubber, taking into account the viscosity of the mass, depends on the method of forming chosen.

The procedure of the two-stage injection molding method is similar to that of the two-stage fabrication of bicolor injection molded pieces. The piece which is inserted is a molded piece comprised of PPE material. The cylinders and screws of the injection molding machine are set up for rubber processing, in known fashion, and the molding device is heatable to the vulcanization temperature.

The preferred covulcanization conditions depend on the rubber mixture chosen, and particularly on the vulcanization system, as well as on the shape of the molded piece. Reference at this point is made to W. Hofmann, loc. cit., pp. 255 ff. This book also describes preferred formulations for the admixture of the diene rubbers with stearic acid, zinc oxide, fillers such as carbon black, softening oils, and vulcanization activators. In particular, sulfur-containing vulcanization activators are used.

Suitable mass temperatures of the rubber mixture in the cylinder are in the range 40°-80° C., preferably 60°-75° C.

Suitable device temperatures are 140°-200° C., preferably 150°-180° C. When PPE materials are being used which have a high content of styrene resins or a high content of fire retardants, which lower the shape stability under heating, a temperature is chosen in the lower part of the indicated range.

Vulcanization times are between 30 sec. and 10 min., preferably between 90 and 150 sec.

When the two-stage extrusion method is used for pressing the components together and for vulcanization, a suitable processing embodiment is as follows: An initially shaped object (for example a tubular object), prepared from PPE material, is surrounded by the rubber mass and vulcanization is carried out, possibly under pressure. The technique is similar with plates, felts, woven fabrics, cables, or the like comprised of PPE material.

When the one-stage injection molding method is used, one proceeds analogously to the known two-component method for manufacturing injection molded pieces with, for example, an expanded core and an outer skin comprised of a different material than that of the expanded core (K. Moerwald, 1977, *Plastverarbeiter,* 28:305-310), or analogously to the two-component method with a reinforced material for the core layer and an unreinforced material for the outer layer; or else analogously to the one-stage method for bicolor injection molding. In the one-stage injection moulding methods one injection molding machine is equipped for processing thermoplastics and the other for processing rubbers. The active part of the device is heated to the prescribed vulcanization temperature, which should be less than the setting temperature of the PPE material.

Objects which can be manufactured from the covulcanizable masses include brake and coupling pressure plates, rubber-coated rolls; flanges, pipe and hose couplings, parts for fittings; housings for pumps and electrically powered tools, lamp housings; membranes, packing rings and the like, sealing structures; parts of hydraulic and pneumatic devices for control and force transmission applications; component parts which absorb noise, vibrations, impacts, and/or radiation; spring elements; PPE-reinforced rubber; shapes; conveyor belts, friction belts, vehicle tires; pressure rollers for videotape and audio tape devices; and caterpillar track members for tracked vehicles.

Having generally described this invention, a further understanding can be obtained by reference to certain specific examples which are provided herein for purpose of illustration only and are not intended to be limiting unless otherwise specified.

(In all of the Examples, the term "parts" means "parts" by weight.)

EXAMPLE 1

PPE Materials 1.1 Poly(2,6-dimethyl-1,4-phenylene ether) with a J-value of 68 ml/g This PPE material was obtained by oxidatively coupling 2,6-dimethylphenol, interrupting the reaction, and then carrying out reaction-extraction as described in German OSs 33 13 864 and 33 23 777. The solvent was removed by evaporation and the melt was extruded in a degassing extruder, followed by granulation.

1.2 Polymer mixture comprised of poly(2,6-dimethyl-1,4-phenylene ether) (90 parts by wt.) and polyoctenylene (10 parts by wt.)

The polymer mixture was prepared from a polyoctenylene component having a J-value of 120 ml/g and a trans-content of 80%. Such a product is commercially available as "Vestenamer ® 8012" (manufactured by Huels AG, D-4370 Marl 1, FRG). Additional characterizing parameters of this product may be found in *Kautschuk+Gummi, Kunststoff,* 1981, pp. 195–190, and in Huels Bulletin No. 2247, entitled "Vestenamer 8012". The polyoctenylene may also be synthesized by the procedure described by K. J. Ivin, 1983, in *Olefin Metathesis,* published by Academic Press, pp. 236 ff., and literature cited therein.

A PPE material having a J-value of 45 ml/g was prepared by the procedure described in Example 1.1, and was mixed with the polyoctenylene in toluene. The PPE material was recovered by the technique described in Example 1.

1.3 Polymer mixture comprised of poly(2,6-dimethyl-1,4-phenylene ether) (78 parts by wt.) and high impact modified polystyrene (HIPS) (22 parts by wt.)

The high impact modified polystyrene employed as one component of the mixture was Vestyron ® 616, of the firm Huels Ag, D-4370 Marl, FRG). The characterizing parameters of this product may be found in the brochure entitled "Plastics of Huels: Vestyron", Edition of September 1979.

The PPE material having a J-value 50 ml/g was obtained by oxidative coupling of 2,6-dimethylphenol, and interruption of the reaction followed by reaction-extraction by the procedure described in German OSs 33 13 864 and 33 32 277. A mixture of this PPE material and the rubber-modified polystyrene in the weight ratio 78 parts PPE and 22 parts modified polystyrene was prepared by the procedure described in German Patent application P 33 27 629.

1.4 Polymer mixture comprised of:
60 parts by wt. poly(2,6-dimethyl-1,4-phenylene ether);
30 parts by wt. HIPS; and
10 parts by wt. polyoctenylene:

Vestyron ® 616 was used as the HIPS, and Vestenamer ® 8012 was used as the polyoctenylene. The procedure employed is that of Example 1.3

1.5 Polymer mixture comprised of:
60 parts by wt. poly(2,6-dimethyl-1,4-phenylene ether);
30 parts by wt. styrene homopolymer; and
10 parts by wt. polyoctenylene:

The styrene homopolymer which was used was Vestyron ® 114, a product of Huels AG, D-4370 Marl, FRG. The characterizing parameters of this product may be found in the brochure "Plastics of Huels: Vestyron", Edition of September 1983. The procedure employed is that of Example 1.4

1.6 Polymer mixture comprised of 52 parts by weight poly(2,6-dimethyl-1,4-phenylene ether) and 48 parts by weight HIPS:

The procedure followed is that described in Example 1.3.

EXAMPLE 2

2.1 A carbon-black filled, plasticizer-containing, powdered E-SBR rubber batch was prepared by mixing the following components:

160 parts—A mixture of a powdered masterbatch comprised of 100 parts E-SBR rubber (styrene content 23 wt. %) and 60 parts carbon black (see Publication No. 5214, Oct. 1983, "Powdered SBR Masterbatches Buna ® EM", of Huels AG)

1 part—Stearic acid
4 parts—Zinc oxide
1 part—N-isopropyl-N'-phenyl-p-phenylenediamine.
1 part—N-(1,3-dimethylbutyl)-N'-phenyl-p-phenylenediamine.
2.5parts—A commercially available age protector which protects against light and ozone (namely "Antilux 111", mfd. by Rhein-Chemie, D-6800 Mannheim, FRG), which agent comprises a paraffinic wax with a broad molecular weight distribution and high average molecular weight.
1.8 parts—Sulfur
1.3 parts—N-cyclohexyl-1-benzothiazolesulfenamide.
0.8 part—Tetramethylthiuram disulfide.
(Note: The sulfur, sulfenamide, and thiuram disulfide ingredients together comprise the "Vulcanization System S1").
0.5 part—Diphenylguanidine
0.3 part—Zinc diethyldithiocarbamate
40 parts—A commercially available aromatic mineral oil plasticizer, e.g., "el 3002 extract" produced by Gulf Oil.

The powder batch was charged directly to an injection molding machine.

2.2 A carbon-black-filled, plasticizer-containing E-SBR rubber in the form of a rolled sheet:

A part of the mixture of Example 2.1 was rolled for 5 min. at 50° C. to form a 2 mm thick sheet which was then cut into strips 22 mm wide, which were fed into the injection molding machine.

2.3 Buna® EM 1502:

This material is an E-SBR rubber, as described in the brochure of Huels AG, D-4370 Marl, FRG, entitled "Buna® EM", 4th Ed., published Sept. 1982. This type of rubber corresponds to "Ameripol® 1502", manufactured by Goodrich-Gulf Chemicals Inc., which material is discussed by Runge and Dreyfuss. The SBR copolymer is comprised of styrene in an amount of 23 wt. %. A carbon-black-free mixture was prepared having the following composition (corresponding to the data of Runge and Dreyfuss):

100 parts—Buna® EM 1502
1 part—Stearic acid
4 parts—Zinc oxide
5.7 parts—Lauroyl peroxide.

This and all mixtures mentioned hereinbelow were produced on a 3000×450 mm laboratory roll mill. The roll temperature was 50° C. in all cases, and in all cases the mixing time was 30 min. A curemeter curve was used to establish the vulcanization time.

2.4 Buna® CB 35 NF:

This material is a polybutadiene, as described in the brochure of Bunawerke Huels GmbH and Bayer AG, entitled "Buna® CB: [A] Butadiene Rubber for the Rubber Industry" (Reference no. Ka 30 996, Edition of 4/83). This type of rubber corresponds to the type "diene 35 NFA" of Firestone Tire and Rubber Co., which is discussed by Runge and Dreyfuss. It is a lithium rubber having a 1,4-cis content of 38%. A carbon-black-free mixture was prepared having the following composition (corresponding to the data of Runge and Dreyfuss):

100 parts—Buna® CB 35 NF
0.5 part—Stearic acid
3 parts—Zinc oxide
1.5 parts—Sulfur
12 parts—Zinc N,N-diethyldithiocarbamate
1.5 parts—Dibenzothiazyl disulfide
or 2.4 parts—Dicumyl peroxide
or 9.1 parts—Lauroyl peroxide.

(Note: The sulfur, dithiocarbamate, and disulfide ingredients together comprise the "Vulcanization System S2". Likewise the sulfur dithiocarbamate, and dicumyl peroxide ingredients together comprise the "Vulcanization System P1". Likewise the sulfur, dithiocarbamate, and lauroyl peroxide together comprise the "Vulcanization System P2".

2.5 A carbon-black-containing mixture analogous to the mixture of Example 2.4 was formulated and contained the following additional components:

60 parts—"Corax® N330" carbon black (manufactured by Degussa, of D-6000 Frankfurt, FRG).
35 parts—Paraffinic-naphthenic oil, e.g., "Tudalen® B 80" (manufactured by Dahleke, of D-2070 Ahrensburg, FRG) (see also W. Hofmann, loc. cit., pp. 354 ff.)

A curemeter curve was used to establish the vulcanization time.

2.6 A mixture based on a high styrene content E-SBR rubber:

The rubber is described in the above-mentioned ("Buna® EM") brochure, and comprises styrene in the amount of 40 wt. %. The composition of the mixture was as follows:

100 parts—Buna® EM 1516
5 parts—Zinc oxide
2 parts—Stearic acid
50 parts—Corax® N330 carbon black
5 parts—"Gulf el 3002 extract" aromatic oil
0.5 parts—Sulfur
1.3 parts—Benzothiazyl-2-cyclohexylsulfenamide (CBS) ("Vulkazit CZ" of Bayer).
1.0 part—Tetramethylthiuram disulfide (TMTD) ("Vulkazit-Thiuram" of Bayer).

(Note: The sulfur, CBS, and TMTD together comprise the "Vulcanization System S2".)

2.7 Mixture based on an L-SBR rubber:

L-SBR rubber is described in Publication 4242, Edition of 11/84, of Huels AG, and comprises styrene in the amount of 25 wt. %. L-SBR rubber was produced by copolymerizing 15–40 wt % styrene and correspondingly 85–60 wt. % butadiene in hexane. The Mooney viscosity $ML_{(1+4)}$ at 100° C. of the product was in the range 35–45. The mixture differed from the mixture of Example 2.6 only by the use of 100 parts by weight Buna® SL 705 in place of the Buna® EM 1516.

2.8 A mixture based on a low styrene content L-SBR rubber:

The mixture differed from that of Example 2.7 by the use of 100 parts by wt. Buna® SL 704 in place of the Buna® SL 705. Buna® SL 704 is a rubber having a styrene content of 18 wt. %.

2.9 A mixture based on a high styrene content, oil-extended E-SBR:

This mixture differed from that of Example 2.6 by the use of 137.5 parts by wt. of Buna® EM 1721 (in place of the Buna® EM 1516). Buna® EM 1721 is a rubber having 37.5 wt. % high-aromatic oil.

2.10 Mixture based on an E-SBR rubber and a polyoctenylene:

This rubber is described in the above-mentioned brochure, and contains styrene in the amount of 23 wt. %. The polyoctenylene is described in Example 1.2. The mixed composition is as follows:

80 parts—Buna® EM 1500
20 parts—Vestenamer® 8012
5 parts—Zinc oxide
2 parts—Stearic acid
50 parts—Corax® N220 carbon black
10 parts—"Gulf el 3002 extract" aromatic oil
2.8 parts—"Vulcanization System S2" (Example 2.6).

2.11 A mixture based on a polybutadiene rubber and a polyoctenylene: The two components are described in Examples 2.4 and 1.2, respectively. The composition of the mixture was as follows:

80 parts—Buna® EM 1500
20 parts—Vestenamer® 8012
3 parts—Zinc oxide
2 parts—Stearic acid
60 parts—Corax® N330 carbon black
15 parts—Gulfpar 60P" naphthenic oil
1 5 parts—Sulfur
0.9 parts—Benzothiazyl-2-tert-butylsulfenamide (TBBS) ("Vulcazit NZ", manufactured by Bayer).

2.12 A mixture based on two polybutadiene rubbers:

This mixture differs from that of Example 2.11 by the use of 50 parts by wt. Buna® CB 35 NF and 50 parts by wt. Buna® CB 10 (in place of the Buna® EM 1500 and the Vestenamer® 8012, respectively.) The rubbers were manufactured with the aid of a co-catalyst. The 1,4-cis content of the product rubber was 96%.

2.13 A mixture based on an isoprene rubber:

A synthetic IR rubber manufactured by the firm Goodyear was used. This rubber is prepared in solution with the aid of titanium catalysts. The cis-fraction was 97%, and the Mooney viscosity $ML_{(1+4)}$ at 100° C. was in the range 75-95. The composition of the mixture was as follows:

100 parts—Natsyn ® 2200
1 part—2,2,4-trimethyl-1,2-dihydroquinoline (TMO) ("Vulkanox ® HS" manufactured by Bayer).
1.5 parts—N-isopropyl-N'-phenyl-p-phenylenediamine (IPPD).
5 parts—Zinc oxide
2.5 parts—Stearic acid
2.5 parts—Zinc salts of unsaturated carboxylic acids ("Aktiplast" manufactured by Rhein-Chemie, of D-6800 Mannheim, FRG).
50 parts—Corax ® N550 carbon black
5 parts—"Gulfpar ® 60P" naphthenic oil
3 parts—Sulfur
1 part—Benzothiazyl-2-sulfenmorpholide (MBS) ("Vulkazit MOZ" of the firm Bayer).
0.2 part—Tetramethylthiuram monosulfide (TMTM) ("Vulkazit Thiuram MS" of the firm Bayer).

2.14 A mixture based on an isobutylene-isoprene rubber:

According to Hofmann (loc. cit.) this rubber is a mixed polymer prepared from isobutylene and isoprene, with the polymerization being carried out in solution. According to the manufacturer's data, the degree of unsaturation is 2 mol %, and the Mooney viscosity $ML_{(1+8)}$ at 100° C. is 41-49. The composition of the mixture was as follows:

100 parts—Esso Butyl ® 365
1 part—TMQ (see Example 2.14)
1.5 parts—IPPD (see Example 2.14)
5 parts—Zinc oxide
1 part—Stearic acid
50 parts—Corax ® N550 carbon black
═parts—"Gulfpar 60P" naphthenic oil
'parts—Sulfur
1 part—TMTD (see Example 2.6)
0.5 part—2-mercaptobenzothiazole (MBT) ("Vulkazit Mercapto" manufactured by Bayer).

2.15 A mixture based on an E-SBR rubber and a polybutadiene having a high cis-content:

The composition of the mixture was as follows:
25 parts—Buna ® EM 150
75 parts—Buna ® CB 10
5 parts—Zinc oxide
2 parts—Stearic acid
50 parts—Corax ® N330 carbon black
4 parts—"Gulfpar ® 60P" naphthenic oil
2 parts—"Cumaronharz B1/65 Kw10" manufactured by Ruetgerswerke, of D-4100 Duisburg, FRG.
1.6 parts—Sulfur
1.5 parts—CBS (see Example 2.6)
0.1 parts—TMTM (see Example 2.13)

2.16 A mixture based on a E-SBR rubber and a polybutadiene which has a low cis-content:

This mixture differed from that of Example 2.15 by the use of 75 parts by wt. of Buna ® CB 35 (in place of the Buna ® CB 10).

2.17 A mixture based on E-SBR and a polyisoprene rubber which has a low cis-content:

The IR rubber was polymerized using stereospecific Li catalysts in hexane (Hofmann, loc. cit.). The 1,4-cis proportion of the rubber was 92%. The Mooney viscosity $ML_{(1+4)}$ of the rubber at 100° C. was 55-60. This mixture differs from that of Example 2.13 by the use of 80 parts by wt. of Shell "Cariflex IR 305" and 20 parts by wt. Buna ® EM 1502 (in place of the Natsyn ® 2200).

2.18 A mixture based on an E-SBR rubber and two isoprene rubbers:

In addition to the IR rubber described in Example 2.13, which has a high cis-content, an IR rubber having a 3,4-content was used. The latter IR rubber is a developed product produced by anionic polymerization with the aid of butyllithium in hexane, in the presence of a side group regulator (diethylene glycol dimethyl ether). The proportion of 3,4-polymerized product was 75-80%. The Mooney viscosity was about 80. This mixture differs from that of Example 2.13 by the use of 40 parts by weight Natsyn ® 2200, 40 parts by wt. 3,4-IR, and 20 parts by wt. Buna ® EM 1502 (in place of the 100 parts by wt. Natsyn ® 2200).

2.19 A mixture based on an E-SBR rubber, an isoprene rubber, and a vinyl polybutadiene rubber:

In addition to the high cis-content IR rubber described in Example 2.13, a BR rubber having a high 1,2-content was used. This latter rubber is a polymer which is produced by anionic polymerization in the presence of butyllithium and a regulator (see A. F. Halasa et al., 1972, *J. Polym. Science*, part A1, 10:1319-34) in hexane. The 1,2-content of the rubber was 52%. The Mooney viscosity was 50. The mixture differs from that of Example 2.13 by the use of 40 parts by wt. Natsyn ® 2200, 40 parts by wt. 1,2 BR Buna ® VI 1949 and 20 parts by wt. Buna ® EM 1502 (in place of the 100 parts by wt. Natsyn ® 2200).

2.20 A mixture based on a natural rubber and an E-SBR rubber:

Smoked sheets of NR were used which had been mechanically broken down ("masticated") on a roll mill. The Defo hardness of the NR material was 1000. The composition of the mixture was as follows:
25 parts—"Defo 1000" sheets
25 parts—Buna ® EM 1500
5 parts—Zinc oxide
2.5 parts—Aktiplast ® (see Example 2.13)
22 parts—Corax ® N330 carbon black
3 parts—Naphthenic oil
2.5 parts—Sulfur
0.5 parts—CBS (see Example 2.6)
0.2 part—TMTD (see Example 2.6)

2.21 A mixture based on a natural rubber, a high cis-content polybutadiene, and an E-SBR rubber:

The composition of the mixture was as follows:
50 parts—"Defo 1000" sheets
25 parts—Buna ® CB 10
25 parts—Buna ® EM 1500
3 parts—Zinc oxide
2 parts—Stearic acid
22 parts—Corax ® N330 carbon black
3 parts—Naphthenic oil
1.6 parts—Sulfur
1.5 parts—CBS (see Example 2.6)
0.1 part—TMTM (see Example 2.13)

2.22 A mixture based on a poly-2-chlorobutadiene, an acrylonitrile-butadiene rubber, and an E-SBR rubber:

An emulsion-polymerized CR having a Mooney viscosity of 40-45 $ML_{(1+4)}$ at 100° C. was used, along with an emulsion-polymerized NBR having a Mooney viscosity of 30+5 and an acrylonitrile content of 34 wt. % (see the publication of Bayer entitled "Bayer Products for the Rubber Industry", Reference KA 32125, Edition of 07/81). As an agent for aiding processibility, a polyoctenylene having a trans-content of 60%, together with a polybutadiene, was used.

The composition of the mixture was as follows:
40 parts—"Baypren ® 210" CR
25 parts—"Perbunan ® N3302 NS" NBR
25 parts—Buna ® EM 1507
5 parts—Vestenamer ® 6213
5 parts—Buna ® CB 10
1 part—Diphenylamine derivative (DDA) ("Vulkanox ®" manufactured by Bayer).
30 parts—Corax ® N550 carbon black
10 parts—Naphthenic oil
5 parts—Zinc oxide
2 parts—Magnesium oxide
1 part—Sulfur
1.2 parts—TMD (see Example 2.6)
0.2 parts—2-mercaptoimidazoline (ETU) ("Vulkazit MPV/C" manufactured by Bayer).

2.23 A mixture based on a poly-2-chlorobutadiene and an E-SBR rubber:

This mixture differed from that of Example 2.22 by the use of 45 parts by wt. CR (of the type in Example 2.22) and by 45 parts by wt. of Buna ® EM 1507, instead of the 40 parts by wt. CR, 25 parts by wt. NBR, and 25 parts by wt. Buna ® EM 1507.

2.24 A mixture based on an acrylonitrile-butadiene rubber and an E-SBR rubber:

The composition of the mixture was as follows:
25 parts—NBR (see Example 2.22)
75 parts—Buna ® EM 1507
5 parts—Zinc oxide
1 part—Stearic acid
50 parts—Corax ® N550 carbon black
20 parts—Methylenebis(thioglycollic acid) butyl ester ("Vulkanol ® 88" manufactured by Bayer).
0.25 parts—Sulfur
2.5 parts—TMTD (see Example 2.6)
1.5 parts—Dibenzothiazyl disulfide (MBTS) ("Vulkazit DM" manufactured by Bayer).

3. Method of Covulcanization 3.1 A two-stage injection molding process:

Discs having a diameter of 200 mm and a thickness of 3 mm were produced from each of the materials 1.1 to 1.6, in a device equipped to provide central rod feeding. The covulcanization was carried out in the same device, after the cavity was opened to 6 mm and in each case an injection molded piece comprised of a PPE material was inserted. Some of the PPE injection molded pieces were preheated for the indicated time (see Table) in the hot mold before the rubber was injected. The following Tables give these data and the selected covulcanization conditions for each of the rubber mixtures employed.

The adhesive strength for the elastomer-thermoplastic junction were determined using DIN 53 531 and DIN 53 539 standards, with the test procedures differing only in that the test strip was 30 mm wide instead of 25 mm, and the speed of separation was 100 mm/min. Instead of 50 mm/min.

3.2 A two-stage pressing process:

Premanufactured plates comprised of PPE material were inserted into the press along with a rubber sheet, and were pressed at 180° C. for 2 min.

TABLE 1

Junction strength between PPE materials and filler-containing and softening-agent-containing E-SBR rubber

| Example No. | Rubber Type | Material | Device temp. (°C.) | Preheating time (sec) | Covulcanization time (sec) | Adhesive strength (N) | Specific adhesive strength (N/mm) | Type of Separation* |
|---|---|---|---|---|---|---|---|---|
| 3.1.1 | 2.1 | 1.1 | 160 | 0 | 150 | 365 | 12.2 | c |
| 3.1.2 | 2.1 | 1.1 | 160 | 180 | 150 | 325 | 10.8 | c |
| 3.1.3 | 2.1 | 1.1 | 160 | 0 | 300 | 365 | 12.2 | c |
| 3.1.4 | 2.1 | 1.1 | 160 | 180 | 300 | 295 | 9.8 | c |
| 3.1.5 | 2.1 | 1.2 | 160 | 0 | 150 | 355 | 11.8 | c |
| 3.1.6 | 2.1 | 1.2 | 160 | 0 | 300 | 335 | 11.2 | c |
| 3.1.7 | 2.2 | 1.2 | 180 | 0 | 150 | 330 | 11.0 | a |
| 3.1.8 | 2.2 | 1.2 | 180 | 0 | 300 | 275 | 9.2 | a |
| 3.1.9 | 2.1 | 1.3 | 160 | 0 | 150 | 188 | 6.3 | a |
| 3.1.10 | 2.1 | 1.3 | 160 | 0 | 300 | 186 | 6.2 | a |
| 3.1.11 | 2.1 | 1.3 | 180 | 0 | 150 | 154 | 5.1 | a |
| 3.1.12 | 2.1 | 1.3 | 180 | 0 | 300 | 158 | 5.3 | a |
| 3.1.13 | 2.1 | 1.4 | 160 | 0 | 150 | 86 | 2.9 | a |
| 3.1.14 | 2.1 | 1.4 | 160 | 0 | 300 | 82 | 2.7 | a |
| 3.1.15 | 2.1 | 1.5 | 160 | 0 | 150 | 85 | 2.8 | a |
| 3.1.16 | 2.1 | 1.5 | 160 | 180 | 150 | 65 | 2.2 | a |
| 3.1.17 | 2.1 | 1.6 | 160 | 0 | 150 | 60 | 2.0 | a |
| 3.1.18 | 2.1 | 1.6 | 160 | 180 | 150 | 76 | 2.5 | a |

*c = cohesive, with separation of the elastomers.
a = adhesive, with separation occurring between the elastomers and the PPE material

TABLE 2

Vulcanization conditions and junction strengths for binding produced by compression moulding, between PPE materials and rubbers

| Example No. | Rubber Type | Material | Vulcanization Agent | Vulcanization temp. (°C.) | Vulcanization time (min) | Filler Material (1) | Adhesive strength (N) | Specific adhesive strength (N/mm) | Type of Separation |
|---|---|---|---|---|---|---|---|---|---|
| 3.2.1 | 2.2 | 1.1 | S1 (2) | 180 | 3 | yes | 108 | 3.6 | a (7) |
| 3.2.2 | 2.2 | 1.2 | S1 | 180 | 3 | yes | 104 | 3.5 | a |
| A | 2.3 | 1.1 | Pe (5) | 85 | 360 | yes | 40 | 1.3 | c (8) |

TABLE 2-continued

Vulcanization conditions and junction strengths for
binding produced by compression moulding, between PPE materials and rubbers

| Example No. | Rubber Type | Material | Vulcanization Agent | Vulcanization temp. (°C.) | Vulcanization time (min) | Filler Material (1) | Adhesive strength (N) | Specific adhesive strength (N/mm) | Type of Separation |
|---|---|---|---|---|---|---|---|---|---|
| B | 2.4 | 1.1 | S2 (3) | 65 | 540 | — | n.m. (6) | — | c |
| C | 2.5 | 1.1 | S2 | 65 | 540 | yes | n.m. | — | c |
| D | 2.4 | 1.1 | P1 (4) | 150 | 120 | — | n.m. | — | c |
| E | 2.5 | 1.1 | P1 | 150 | 120 | yes | 28 | 0.9 | a |
| F | 2.4 | 1.1 | P2 | 85 | 300 | — | n.m. | — | c |
| G | 2.5 | 1.1 | P2 | 85 | 300 | yes | 16 | 0.5 | a |

(1) Carbon black;
(2) System S1 = Sulfur, N-cyclohexyl-1-benzothiasulfenamide and tetramethylthiuram disulfide;
(3) System S2 = Sulfur, zinc N,N-diethyldithiocarbamate, and dibenzothiazyl disulfide;
(4) System P1 = Dicumyl peroxide;
(5) System P2 = Lauroyl peroxide;
(6) Not measurable;
(7) Adhesive;
(8) Cohesive.

TABLE 3

| Example No. | Rubber Mixture | Covulcanization time (min.) | Adhesive strength (N) | Specific adhesive strength (N/mm) | Type of adhesion |
|---|---|---|---|---|---|
| 3.3.1 | 2.6 | 4 | 990 | 33.0 | c |
| 3.3.2 | 2.6 | 4 | 313 | 10.4 | c |
| 3.3.3 | 2.8 | 4 | 365 | 12.2 | c |
| 3.3.4 | 2.9 | 4 | 315 | 10.5 | c |
| 3.3.5 | 2.10 | 4 | 330 | 11.0 | (c) |
| 3.3.6 | 2.11 | 6 | 124 | 4.1 | c |
| 3.3.7 | 2.12 | 6 | 127 | 4.2 | c |
| 3.3.8 | 2.13 | 4 | 300 | 10.0 | c |
| 3.3.9 | 2.14 | 4 | 105 | 3.5 | (c)$^3$ |
| 3.3.10 | 2.15 | 4 | 415 | 13.8 | (c)$^2$ |
| 3.3.11 | 2.16 | 4 | 350 | 11.7 | c |
| 3.3.12 | 2.17 | 4 | 215 | 7.2 | c |
| 3.3.13 | 2.18 | 4 | 185 | 6.2 | c |
| 3.3.14 | 2.19 | 4 | 145 | 4.8 | c |
| 3.3.15 | 2.20 | 4 | 200 | 6.7 | c |
| 3.3.16 | 2.21 | 5 | 300 | 10.0 | c |
| 3.3.17 | 2.22 | 4 | 250 | 8.3 | c |
| 3.3.18 | 2.23 | 4 | 213 | 7.1 | c |
| 3.3.19 | 2.24 | 4 | 102 | 3.4 | (a)$^1$ |

$^1$Adhesive
$^2$Cohesive
$^3$Delamination of the PPE material
Notes:
The PPE material employed in all Examples was that of Example 1.1 except for the rubber mixture of Example 2.10, with which the PPE of Example 1.2 was used. The device temperature was 180° C. There was no preheating.

The FIGURE shows the bonding characteristics of an embodiment of the present invention (Example 3.2.2). This example exhibits a much higher maximum force (in Newtons) than a comparative system described by Runge and Dreyfuss (Example G). The adhesion work perameter given by the latter authors is not a suitable scale for comparison, because it leaves the deformation and strength behavior of the elastomers out of consideration, and takes into account only the separation force in the test dimension.

The test results shown in the FIGURE were conducted according to the standard: DIN 53 531 TI. or ASTM D 429, respectively. The FIGURE shows the dependence of the maximum force (N) on the excursion of the moving test clamp (mm).

The test conditions were as follows:
Crosshead speed: 100 mm/min. Climatic conditions in room: 23° C., 50% relative humidity. Sample dimensions: length 100 mm, width 30 mm, h$_1$ (height of thermoplastic)=4 mm, h$_2$ (height of elastomer)=2 mm.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:
1. A method of

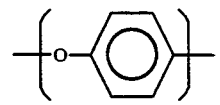

adhering a body of a thermoplastic polyphenylene ether containing molding compound to a body of a synthetic rubber material, consisting essentially of:
covulcanizing a body of said polyphenylene ether containing thermoplastic molding compound in contact with a body of said synthetic rubber containing a vulcanizing system of at least a vulcanizing agent and a vulcanizing accelerator and optionally in addition at least one ingredient selected from the group consisting of extenders, age protectors and fillers with heat, said polyphenylene ether containing thermoplastic molding compound having the composition:

(a) 100 parts by weight of polymers of ortho substituted phenols of the formula:

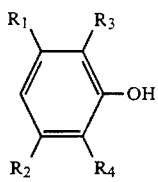

wherein $R_1$ and $R_2$ independently represent a methyl group or hydrogen, and $R_3$ and $R_4$ represent an alkyl group with up to 6 carbon atoms, or $R_3$ represents hydrogen and $R_4$ represents a tertiary alkyl group with up to 6 carbon atoms;

(b) 0-20 parts by weight polyalkenylenes;
(c) 0-100 parts by weight styrene polymers; and
(d) additives;

and said synthetic rubber, containing double bonds, being combined with fillers and plasticizers and being a member selected from the group consisting of (1) styrene-butadiene rubber, (2) polybutadiene, (3) isoprene rubber, (4) isobutene-isoprene rubber, (5) mixtures of at least two rubbers (1)-(4), and (6) mixtures of any one or more rubbers (1)-(5) with up to 80 wt. % of the rubber mixture being substituted by chlorinated isobutylene-isoprene rubber, up to 95 wt. % of the rubber mixture being substituted by natural rubber, up to 60 wt. % of the rubber mixture being substituted by chloroprene rubber or up to 25 wt. % of the rubber mixture being substituted by acrylonitrile-butadiene rubber.

2. The method of claim 1, wherein the synthetic rubber formulation additionally is combined with stearic acid and zinc oxide as vulcanization activators.

3. The method of claim 2, wherein said activator is a sulfur-containing compound.

4. The method of claim 1, wherein said synthetic rubber additionally contains polyoctenylenes.

5. The method of claim 1, wherein the covulcanization is carried out at a temperature ranging from 140°-200° C., and a reaction time of 30 sec. to 10 min.

6. The method of claim 5, wherein the reaction temperature and time range from 150°-180° C. and 90-300 sec. respectively.

7. The method of claim 1, wherein the temperature of the body of the synthetic rubber is 40° to 80° C. at the beginning of the covulcanization.

8. The method of claim 7, wherein the temperature of said synthetic rubber is 60°-75° C.

9. The method of claim 1, wherein $R_1$ and $R_2$ each is hydrogen, and $R_3$ and $R_4$ each is methyl.

10. The method of claim 1, wherein said polyalkylene component (b) of said thermoplastic molding compound is present in an amount of 5 to 15 parts by weight in said composition.

11. The method of claim 10, wherein said polyalkylene component is polyoctenylene.

12. The method of claim 1, wherein <3 parts by weight of accelerator are employed per 100 parts by weight rubber.

13. The method of claim 1, wherein said chemical bonding is achieved in a one-stage or two-stage injection molding process.

14. The method of claim 1, wherein said synthetic rubber is a styrene-butadiene rubber, a polybutadiene rubber, or mixtures thereof.

15. The method of claim 14, wherein said synthetic rubber is a pulverous styrene-butadiene rubber.

16. The method of claim 1, wherein said synthetic rubber is an natural rubber - styrene-butadiene rubber mixture or an natural rubber - polybutadiene rubber - styrene-butadiene rubber mixture in which the proportion of the natural rubber is >50 wt. %.

17. The method of claim 1, wherein said synthetic rubber is a chloroprene rubber - styrene-butadiene rubber - acrylonitrile-butadiene rubber mixture, in which the proportion of the chloroprene rubber is >50 wt. % and the proportion of the acrylonitrile-butadiene rubber is less than 25 wt. %.

18. The method of claim 1, wherein said synthetic rubber is a chloroprene rubber - styrene-butadiene rubber mixture in which the proportion of the chloroprene rubber is >50 wt. %.

19. A covulcanized composite product produced by the method of claim 1.

* * * * *